(12) United States Patent
McRae

(10) Patent No.: US 12,614,388 B2
(45) Date of Patent: Apr. 28, 2026

(54) IMAGE CONVERGENCE IN A SMART SECURITY CAMERA SYSTEM WITH A SECONDARY PROCESSOR

(71) Applicant: Arlo Technologies, Inc., Carlsbad, CA (US)

(72) Inventor: Matthew McRae, Laguna Niguel, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 587 days.

(21) Appl. No.: 17/947,534

(22) Filed: Sep. 19, 2022

(65) Prior Publication Data

US 2023/0092530 A1     Mar. 23, 2023

Related U.S. Application Data

(60) Provisional application No. 63/246,165, filed on Sep. 20, 2021.

(51) Int. Cl.
G06V 20/52          (2022.01)
G06T 5/90           (2024.01)
(Continued)

(52) U.S. Cl.
CPC ............... G06V 20/52 (2022.01); G06T 5/90 (2024.01); G06V 10/141 (2022.01); G06V 10/60 (2022.01);
(Continued)

(58) Field of Classification Search
None
See application file for complete search history.

(56) References Cited

U.S. PATENT DOCUMENTS 10,594,990 B1      3/2020  Lemberger et al.
10,636,173 B1 *    4/2020  Beach ................... G06V 10/82
(Continued)

FOREIGN PATENT DOCUMENTS

CN        206711341 U  * 12/2017
CN        207218885 U  *  4/2018
(Continued)

OTHER PUBLICATIONS

U.S. Appl. No. 17/851,619, filed Jun. 28, 2022.
(Continued)

*Primary Examiner* — Ricky Chin
(74) *Attorney, Agent, or Firm* — Boyle Fredrickson, S.C.

(57)          ABSTRACT

A smart camera for an electronic monitoring system is provided. The smart camera includes an imaging device having a field of view and being configured to capture an image. The imaging device has a variable exposure. A detector is operatively connected to the imaging device and configured to generate a trigger signal in response to activity within the field of view. A first processor is operatively connected to the detector and the imaging device, and a second processor is operatively connected to the detector and the imaging device. A computer-readable memory is operatively connected to the first processor and the second-ary processor. The computer-readable memory is configured to store a map of ambient light levels in the field of view at selected times of day. The second processor varies the exposure of the imaging device in response to the trigger signal.

6 Claims, 5 Drawing Sheets

(51) Int. Cl.
  *G06V 10/141* (2022.01)
  *G06V 10/60* (2022.01)
  *G06V 20/40* (2022.01)

(52) U.S. Cl.
  CPC .... *G06V 20/44* (2022.01); *G06T 2207/10144* (2013.01)

(56) References Cited

U.S. PATENT DOCUMENTS

| | | | | |
|---|---|---|---|---|
| 11,381,743 | B1 * | 7/2022 | Mahbub | H04N 23/65 |
| 11,748,445 | B1 * | 9/2023 | Sommer | G06F 18/213 |
| | | | | 382/201 |
| 2011/0275316 | A1 | 11/2011 | Suumaki et al. | |
| 2014/0266705 | A1 | 9/2014 | McKinley et al. | |
| 2014/0337923 | A1 | 11/2014 | Anders et al. | |
| 2014/0354768 | A1 | 12/2014 | Mei et al. | |
| 2014/0354811 | A1 * | 12/2014 | Weber | B60R 1/23 |
| | | | | 348/148 |
| 2016/0277688 | A1 * | 9/2016 | Gaskamp | H04N 23/661 |
| 2016/0338136 | A1 | 11/2016 | Zhang et al. | |
| 2017/0099157 | A1 | 4/2017 | Jacobson et al. | |
| 2017/0280109 | A1 * | 9/2017 | Scalisi | H04N 23/667 |
| 2018/0069722 | A1 * | 3/2018 | Scalisi | H04N 7/186 |
| 2018/0074519 | A1 * | 3/2018 | Qin | G05D 1/0094 |
| 2018/0249552 | A1 * | 8/2018 | Bitton | H05B 47/11 |
| 2018/0286200 | A1 | 10/2018 | Gordon et al. | |
| 2018/0302559 | A1 * | 10/2018 | Lee | H04N 23/667 |
| 2018/0322751 | A1 * | 11/2018 | Sacre | H04N 23/74 |
| 2018/0339720 | A1 * | 11/2018 | Singh | G06T 7/001 |
| 2019/0180502 | A1 * | 6/2019 | England | G01S 7/417 |
| 2019/0208111 | A1 * | 7/2019 | Wendel | H04N 23/73 |
| 2019/0261243 | A1 | 8/2019 | Amini et al. | |
| 2019/0281687 | A1 * | 9/2019 | Chen | F21V 23/045 |
| 2019/0340924 | A1 * | 11/2019 | Abari | G06V 20/58 |
| 2019/0347916 | A1 * | 11/2019 | Wild | H04L 67/1095 |
| 2020/0068111 | A1 * | 2/2020 | Naing | H04N 23/73 |
| 2020/0122344 | A1 * | 4/2020 | Lee | B25J 9/1697 |
| 2020/0125113 | A1 * | 4/2020 | Eoh | G06F 18/2413 |
| 2020/0125597 | A1 * | 4/2020 | Eoh | G05D 1/0274 |
| 2020/0264312 | A1 * | 8/2020 | Hill | B60W 40/105 |
| 2020/0344695 | A1 | 10/2020 | Wang et al. | |
| 2021/0099676 | A1 * | 4/2021 | England | H04N 7/181 |
| 2021/0110140 | A1 * | 4/2021 | Munoz | G06F 18/213 |
| 2021/0112647 | A1 * | 4/2021 | Coleman | H05B 47/16 |
| 2021/0173047 | A1 * | 6/2021 | Droz | G01S 7/484 |
| 2021/0195084 | A1 * | 6/2021 | Olajos | H04N 23/75 |
| 2021/0329159 | A1 * | 10/2021 | Zhao | H04N 23/71 |
| 2021/0365052 | A1 * | 11/2021 | Burdick | G08G 5/0034 |
| 2021/0407262 | A1 * | 12/2021 | Farneman | G08B 13/19619 |
| 2022/0224832 | A1 * | 7/2022 | Duran | H04N 23/667 |
| 2022/0318728 | A1 * | 10/2022 | Rao | G06Q 20/208 |
| 2022/0368556 | A1 * | 11/2022 | Scalisi | H04N 23/661 |
| 2023/0064892 | A1 * | 3/2023 | Carter | G08B 13/19608 |
| 2023/0092530 | A1 * | 3/2023 | McRae | G06T 5/90 |
| | | | | 348/143 |
| 2023/0162577 | A1 * | 5/2023 | Van De Sluis | H04N 7/188 |
| | | | | 340/567 |
| 2023/0316633 | A1 * | 10/2023 | Wu | G06T 15/50 |
| | | | | 345/426 |
| 2024/0137653 | A1 * | 4/2024 | Singh | H04N 23/62 |
| 2024/0185062 | A1 * | 6/2024 | Charnock | G06Q 50/01 |
| 2024/0185610 | A1 * | 6/2024 | Singh | G06T 5/50 |
| 2024/0200763 | A1 * | 6/2024 | Shih | F21V 21/29 |
| 2024/0310030 | A1 * | 9/2024 | Shih | H04N 23/51 |

FOREIGN PATENT DOCUMENTS

| | | | | | |
|---|---|---|---|---|---|
| CN | 109462657 | A | * | 3/2019 | |
| CN | 111357006 | A | * | 6/2020 | G06K 9/00 |
| CN | 113227839 | A | * | 8/2021 | G01S 17/08 |
| CN | 113792587 | A | * | 12/2021 | G06F 18/24 |
| CN | 111476071 | B | * | 9/2023 | G06K 9/00046 |
| DE | 112020000836 | T5 | * | 1/2022 | G05B 17/02 |
| EP | 2100454 | | | 9/2009 | |
| EP | 2693811 | | | 2/2014 | |
| EP | 2740301 | | | 6/2014 | |
| WO | WO-2014198570 | A1 | * | 12/2014 | A61B 5/0077 |
| WO | WO-2020094587 | A1 | * | 5/2020 | G01J 1/4204 |
| WO | 2021046402 | | | 3/2021 | |

OTHER PUBLICATIONS

U.S. Appl. No. 17/825,196, filed May 26, 2022.
U.S. Appl. No. 17/851,600, filed Jun. 28, 2022.
U.S. Appl. No. 17/862,976, filed Jul. 12, 2022.

* cited by examiner

IMAGE CONVERGENCE IN A SMART SECURITY CAMERA SYSTEM WITH A SECONDARY PROCESSOR

CROSS-REFERENCE TO A RELATED APPLICATION

This application claims the benefit of provisional patent application U.S. App. No. 63/246,165, filed on Sep. 20, 2021 and entitled "Image Convergence in a Smart Security Camera System with a Secondary Processor", the entire contents of which are hereby expressly incorporated by reference into the present application.

BACKGROUND OF THE INVENTION

1. Field of the Invention

The present invention relates generally to networked electronic monitoring systems, and in particular, to a smart camera for an electronic monitoring system that includes a secondary processor for image convergence. The invention additionally relates to a process of using such a system.

2. Discussion of the Related Art

Modern electronic monitoring systems for the home include doorbells, along with video and audio communication technology. For example, the typical electronic monitoring system may include a smart camera having one or more monitoring devices which typically include, but may not be limited to, imaging devices or cameras directed at various activity zones to be monitored for the simultaneous video and audio communication to a user on a computing device and one or more image sensors which are directed at the activity zones such that motion in the activity zones or upon a captured image of an activity zone matching a predetermined image triggers the electronic monitoring system. Many of these imaging devices take the form of "smart cameras" having considerable processing capability for performing processing operations ranging from simple filtering operations to more complex operations such as facial recognition or other classification operations. When performed by the smart camera, these processing operations are sometimes referred to as "edge processing" operations because they are permed by "edge devices" of a system rather than by a central processor such as a cloud-based processor. The electronic monitoring system typically further includes a hub or base station to communicate with the monitoring device's smart camera and with an external server, such as a cloud-based server. In addition, the hub or base station may also communicate with one or more user devices such as a desktop computer, a laptop computer, a smartphone, or a tablet.

While functional for their intended purposes, the processors of prior smart cameras s have certain limitations. For example, upon the triggering of the electronic monitoring system, the smart cameras start up with no information on the environment outside of the smart camera. As such, when the electronic monitoring system is triggered, the processor of the smart camera smart camera has no conception of what the correct exposure, brightness, and contrast settings should be for the video images provided by the camera's image device. For example, in a bright environment, the first frames of the video may be overexposed, resulting in images that are bright white and show no detail. Alternatively, in low light, the first frames of the video may be underexposed, resulting in images that are dark and show reduced or no detail. Until the exposure of the video images supplied by the imaging device is adjusted to a level that balances the brightness and contrast settings, a process hereafter referred to as "convergence," the video supplied by the imaging device is unusable. Typically, these first frames of the video with no detail are discarded without being displayed on a user device. However, if the convergence process takes longer, the first part of a video will show some of the over exposed or under exposed images.

In order to permit a monitoring system to display acceptable video on a user device, the processor of each smart camera must have sufficient computing capacity to quickly adjust the exposure of the video images supplied by the camera's imaging device. However, the addition of more processing capability to the processor of the smart camera will necessarily result in a corresponding increase in the power consumed by the smart camera. Since batteries are often used to power these types of smart cameras, the increase in power consumed by the added processing capabilities to the processor of the smart camera will cause the battery to drain more rapidly. The rapid drain of the battery will require the user to frequently replace or charge the battery of the smart camera or risk having the smart camera fall offline and no longer be operable or reachable by an end user. This failure is a nuisance, at the very least, and can be a serious problem if these devices are used for security purposes.

In view of the foregoing, it is a primary object and feature of the present invention to provide a smart camera for an electronic monitoring system that has improved image convergence when compared to prior smart cameras.

It is a further object and feature of the present invention to provide a smart camera for an electronic monitoring system that includes a second processor for image convergence without waking a first, possibly main, processor of the smart camera.

It is a still further object and feature of the present invention to provide a smart camera for an electronic monitoring system that includes a secondary processor for image convergence that has longer battery life than prior smart cameras.

In accordance with an aspect of the present invention, a smart camera for an electronic monitoring system is provided. The smart camera includes an imaging device having a field of view and being configured to capture an image. The imaging device has a variable exposure. A detector is operatively connected to the imaging device and configured to generate a trigger signal in response to activity within the field of view. A first processor is operatively connected to the detector and the imaging device. The first processor has a low power mode and an operation mode. A second processor is operatively connected to the detector and the imaging device. A computer-readable memory is operatively connected to the first processor and the secondary processor. The computer-readable memory is configured to store a map of ambient light levels in the field of view at selected times of day. The second processor varies the exposure of the imaging device in response to the trigger signal.

The first processor may be a main processor, and the second processor may be a secondary processor.

An ambient light sensor may be operatively connected to first processor. The ambient light sensor senses ambient light levels in the field of view. Upon initialization of the smart camera, the first processor is configured to generate the map of ambient light levels in the field of view at the selected times of day in response to the ambient light levels sensed by the ambient light sensor. Alternatively, the ambient light sensor may be operatively connected to the second processor. The first processor is placed the low power mode when the second processor varies the configuration of the imaging device in response to the map. The imaging device includes an adjustable aperture and shutter speed. Adjustment of the adjustable aperture and shutter speed varies the exposure of the imaging device.

Also disclosed is a monitoring systems having one or more smart cameras of the type generally discussed above and a method of operating a smart camera and a method of monitoring system having one or more smart cameras.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION

Figure 1:
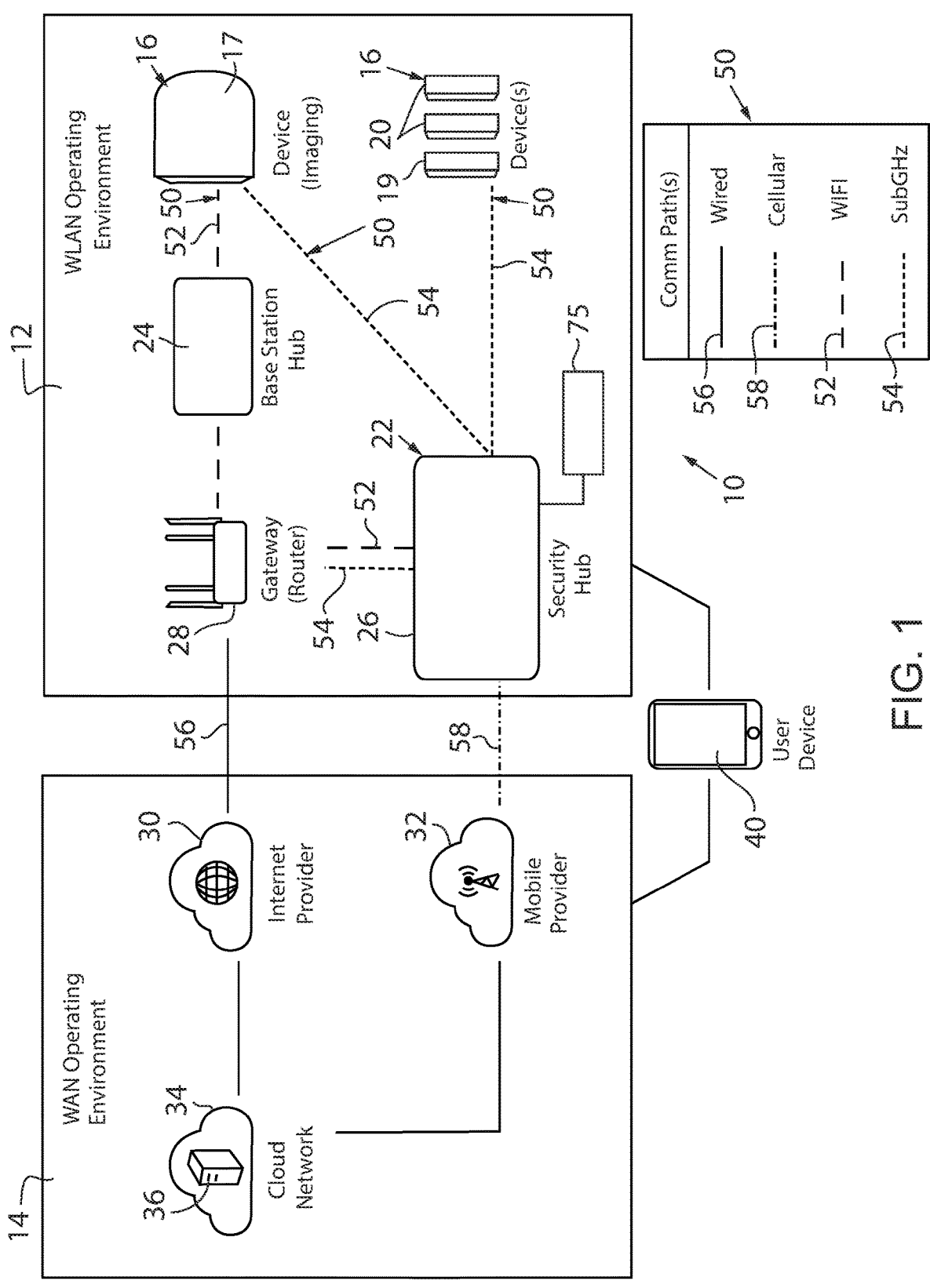
FIG. 1 is a schematic representation of a networked electronic monitoring system including a smart camera in accordance with an aspect of the present invention.

Referring to FIG. 1, a networked electronic monitoring system 10 in accordance with the present invention is generally designated by the reference numeral 10. Monitoring system 10 is implemented in a WLAN (wireless local area network) operating environment (hereinafter referred to as "WLAN 12") having various communication paths, collectively designated by the reference number 50. WLAN 12 is communicatively connected to a WAN (wide area network) operating environment or WAN 14. Within WLAN 12, various electronic monitoring devices 16, sometimes referred to as "client devices," are wirelessly networked to a base station or high frequency hub 24. Hub 24, in turn, communicates via a primary wireless I/O communication device 74 with WAN 14 via a gateway hub shown as gateway router 28, which also includes a primary wireless I/O communication device 74. As is conventional, base station 24 and gateway router 28 are electrically powered by and operatively connected to a power source (not shown), such as a 120 volt or 240 volt, 60 Hertz, electrical power supplied by a utility.

Base station hub 24 and router 28 provide a high frequency connection to WAN 14 via primary wireless I/O communication devices 74. Base station hub 24 may be eliminated as a stand-alone module if its functionality and circuitry are incorporated into the gateway router 28, in which case the router also serves as a base station hub. Monitoring system 10 also includes security hub 26 that communicates with the monitoring device(s) 16 via primary and secondary wireless I/O communication devices 74 and 76, respectively, and with WAN 14 via high frequency connection 52, low frequency connection 54, and/or cellular radio 78, as hereinafter described. Security hub 26 is also electrically powered by and operatively connected to a power source (not shown), such as a 120 volt or 240 volt, 60 Hertz, electrical power supplied by a utility, and to a power back-up system 75, such as a battery back-up system, that supplies electrical power to security hub 26 in the event of a power outage of the electrical power supplied to the utility. As with the base station hub 24, the security hub 26 may be eliminated as a stand-alone module if its functionality is incorporated into the gateway router 28, in which case the router also serves as a security hub.

Figure 2:
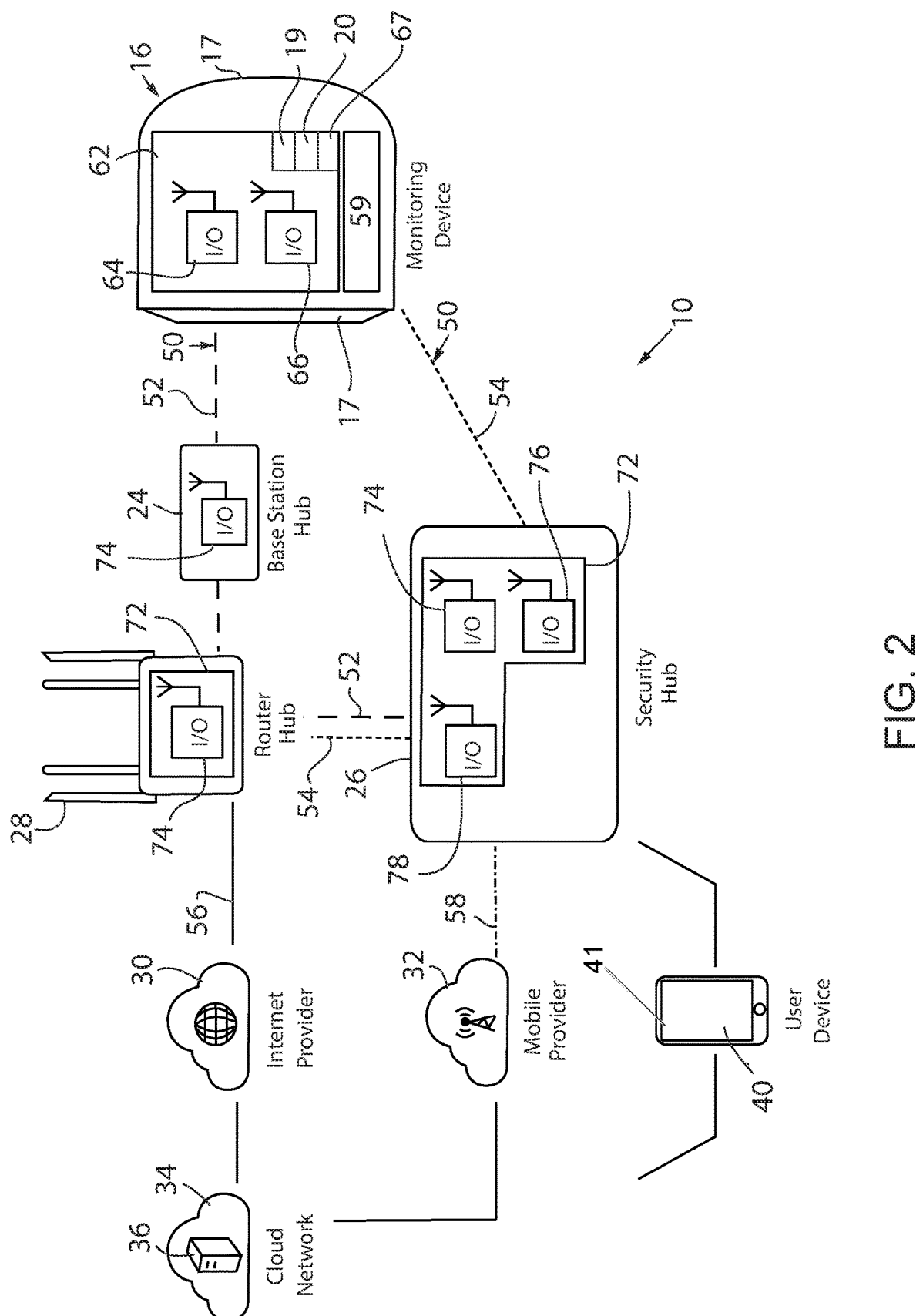
FIG. 2 is a detailed schematic representation of the networked electronic monitoring system of FIG. 1.

Security hub 26 communicates with the router 28 through a high frequency connection 52 and/or a low frequency connection 54 to router 28 via primary and secondary wireless I/O communication devices or radios 74 and 76, respectively. Security hub 26 further includes cellular radio 78 for transmitting data between the WLAN 12 (FIG. 1) and WAN 14 (FIG. 1) through cellular communication path 58. Security hub 26 is also provided with the capability providing high frequency and low frequency connections with monitoring devices 16 through primary and secondary communication paths 52 and 54, respectively. Thus, as hereinafter described, it is contemplated for monitoring devices 16 to have two wireless I/O communication devices operating at different frequencies, FIG. 2. A first, "primary wireless I/O communication device" operates at a first frequency, typically at a relatively high frequency of 2.4 GHz to 5 GHZ, during period of normal conductivity. m Monitoring and data capture functions, such as video capture and transmission, sound transmission, motion sensing, etc., are performed at this frequency. The second or "secondary wireless I/O communication device" operates at a second frequency that is immune or at least resistant to resistance from signals that typically jam signals over the first frequency. The second frequency may be of considerably longer frequency (in the sub-GHz or even RF range) and may have a longer range than the primary wireless I/O communication device. The second frequency is intended for the secondary wireless I/O communication device to be operable on secondary communication path 54 when communications over the primary communication path 52 are disrupted, as hereinafter described, to permit the continued operation of monitoring devices 16, as well as, to permit transmission and display of information regarding the communications disruption to be transmitted and displayed for a user.

Still referring to FIG. 1, each monitoring device 16 of monitoring system 10 may perform a variety of monitoring, sensing and communicating functions. One such device is Arlo Chime™ which has only audio capabilities. Other types of monitoring devices 16 may include a smart camera, as hereinafter described, or imaging devices and/or sensors 20 may be incorporated into form factors of other house or building accessories, such as doorbells, floodlights, etc.

It is contemplated for one type of monitoring device 16 to be a smart camera 17, which includes an imaging device 18, such as a video camera, that is configured to capture and store visual images or video of the monitored area within the environment, as hereinafter described. Imaging device 18 may take the form of an Arlo® video camera available from Arlo Technologies, Inc. of Carlsbad, California. Typically, monitoring system 10 will include multiple smart cameras 17 having imaging devices 18 mounted to face toward respective areas being monitored, such as around a building or other structure or area.

Figure 3:
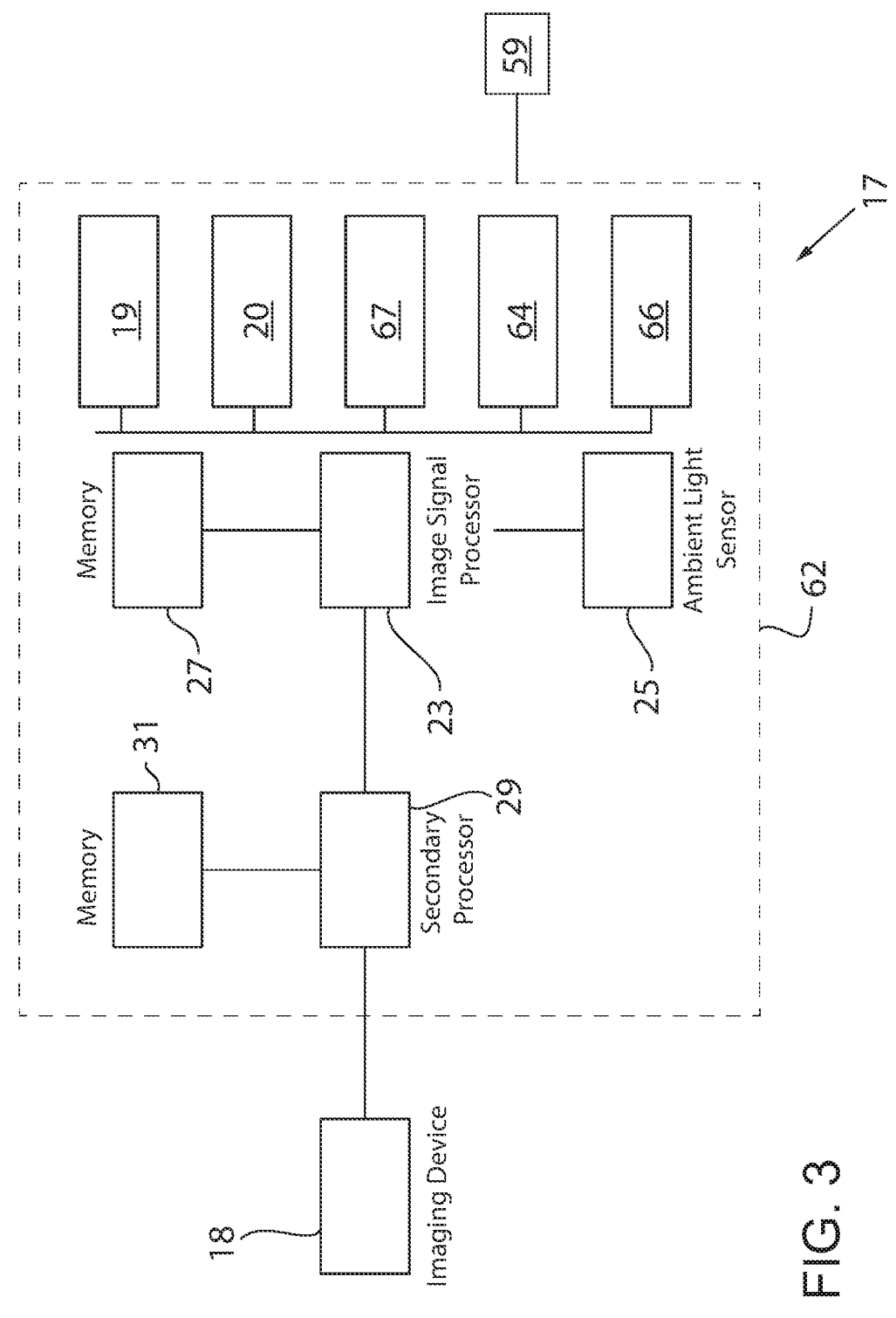
FIG. 3 is a schematic representation of the smart camera in accordance with an aspect of the present invention.

Referring to FIG. 3, in addition to imaging device 18, smart camera 17 may include various types of sensors and have audio capability and corresponding circuitry 62 to effectuate operation of smart camera 17. More specifically, circuitry 62 may include, for example, imagers, an audio circuit, and a media encoder, among other components. In addition, circuitry 62 of smart camera 17 also includes multiple wireless I/O communication devices or radios, including a primary wireless I/O communication device or radio 64 and a secondary wireless I/O communication device or radio 66 and, optionally, a radio frequency detector and/or a wireless frequency spectrum analyzer 67, to detect interference on WLAN 12. The primary communication device 64 communicates with the hub primary communication device 74 via the primary communication path 52. The secondary communication device 66 communicates with the security hub secondary communication device 76 via the secondary communication path 54.

Further, circuitry 62 of smart camera 17 includes one or more sensors 20 configured to detect one or more types of conditions or stimulus, for example, motion, heat, opening or closing events of doors or windows, the presence of smoke, carbon monoxide, water leaks, and temperature changes. Instead of or in addition to such sensors 20, circuitry 62 of smart camera 17 may include audio device(s) 19 such as microphones, sound sensors, and speakers configured for audio communication or providing audible alerts. Circuitry 62 of smart camera 17 further includes a main processor or image signal processor 23 which, along with circuitry 62, perform a range of tasks. These tasks may include, but are not limited to, capturing the video image from imaging device 18, processing the captured video image to generate an enhanced video image; controlling the acquisition and transmission of data; and transmitting the enhanced media stream to a respective hub 24 and/or 26 for further processing and/or further transmission to a server, such as the server 36 of the cloud-based control service system 34 and/or the user device(s) 40. It can be appreciated that image signal processor 23 may perform additional tasks, as hereinafter described, without deviating from the scope of the present invention. Image signal processor 23 can toggle between 1) a low power mode in which image signal processor 23 performs only essential tasks to insure proper operation of smart camera 17, thereby minimizing the electrical power drawn from battery 59, and 2) an operation mode, in which image signal processor 23 is awake and capable of performing all programmed tasks.

Still referring to FIG. 3, image signal processor 23 is operatively connected to an ambient light sensor 25 for detecting changes in light in the environment surrounding smart camera 17 and computer-readable memory 27 for storing the data associated with changes in light in the environment detected by ambient light sensor 25, for reasons hereinafter described. Secondary processor 29 is operatively connected to image signal processor 23 and to imaging device 18. Imaging device 18 may include various brightness and contrast settings which are adjustable in response to commands from secondary processor 29 and/or image signal processor 23 to ensure for the proper exposure for the video image captured by imaging device 18. Secondary processor 29 can toggle between a low power mode wherein the electrical power drawn from battery 59 by secondary processor 29 is minimized and an operation mode wherein secondary processor 29 is awake and capable of performing all programmed tasks. Secondary processor 29 is selected to consume less electrical energy in its operation mode than image signal processor 23 in its operation mode, for reasons hereinafter described.

Referring back to FIG. 1, gateway router 28 is typically implemented as a WIFI hub that communicatively connects WLAN 12 to WAN 14 through wired connection 56 to internet provider 30. Internet provider 30 includes hardware or system components or features such last-mile connection(s), cloud interconnections, DSL (digital subscriber line), cable, and/or fiber-optics. As mentioned, the functionality of the base station hub 24 also could be incorporated into the router 28, in which case the router 28 becomes the base station hub, as well as the router. Another connection between WLAN 12 and WAN 14 may be provided between security hub 26 and a mobile provider 32. Mobile provider 32 includes hardware or system components or features to implement various cellular communications protocols such as 3G, 4G, LTE (long term evolution), 5G, or other cellular standard(s). As mentioned, the base station hub 24 also could be integrated into the router 28.

Besides the mobile connection, security hub 26 is typically also configured to connect to WAN 14 by way of its connection to router hub 28 and the router hub's connection to WAN 14 through internet provider 30. Each of the internet provider 30 and mobile provider 32 allows the components of monitoring system 10 to interact with a backend system or control services that can control functions or provide various processing tasks of components of monitoring system, shown as a cloud-based backend control service system 34, which could be an Arlo SmartCloud™ system. The backend system service system 34 includes at least one server 36 and typically provides, for example, cloud storage of events, AI (artificial intelligence) based processing such as computer vision and system access to emergency services.

Still referring to FIG. 1, one or more user devices 40, such as a smart phone, tablet, laptop, or PC, may communicate with various components or devices within each of WLAN 12 and WAN 14 to provide an interface through which a user may interact with monitoring system. Each user device 40 includes a display system that typically includes both an audio display and a video display such as a touchscreen 41. Each user device 40 also has internal computing and storage capabilities and a program or application, such as the Arlo Smart application, serving as the user interface with the remainder of monitoring system 10.

Figure 4:
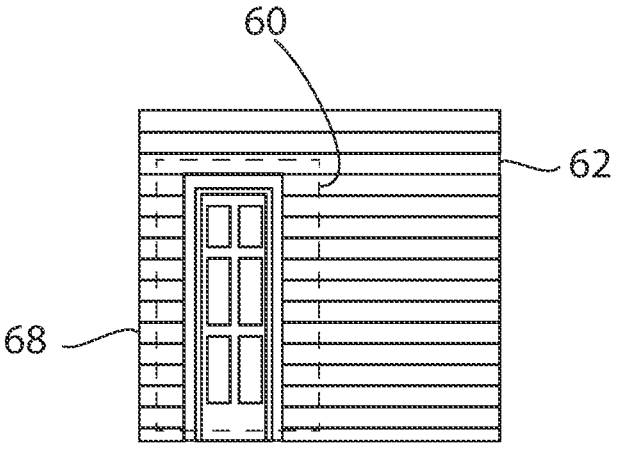
FIG. 4 is a schematic representation of a field of view having an activity zone monitored by the networked electronic monitoring system of FIG. 1.

Referring to FIG. 4, imaging device 18 of each smart camera 17 is configured, though suitable mounting thereof and/or through suitable manipulation of their controls, to monitor an area of interest, such as a part of a building, e.g., door 68, or a section of property, hereinafter referred to as field of view 62 of imaging device 18. By way of example, it is contemplated for a user to selectively define one or more portions of the field of view 62 of imaging device 12 as activity zones, e.g. activity zone 60, by utilizing the one or more user monitoring devices 16; for one or more predetermined portions of field of view 62 be defined as activity zones, e.g. activity zone 60; or for all or part of the field of view 62 of imaging device 18 to constitute activity zone 60, without deviating from the scope of the present invention.

Upon the powering up and initialization of smart camera 17, image signal processor 23 establishes primary communication path 52 between primary wireless I/O communication device 64 and WLAN 12, as heretofore described, to allow for a high frequency connection to the WAN 14 to permit transmission of data thereon. It is contemplated for smart camera 17 to monitor primary communication path 52 for a fault state. By way of example, radio frequency detector and/or a wireless frequency spectrum analyzer 67 may be used to measure signals and interference on the primary communication path 52. If smart camera 17 detects a communication disruption/interruption in the primary communication path 52, image signal processor 23 activates secondary wireless I/O communication device 66 so as to allow data transmission with secondary wireless I/O communication device 76 of security hub 26 via secondary communication path 54.

In addition, upon initialization of smart camera 17, ambient light sensor 25 monitors the ambient light levels in field of view 62 under direction of the image signal processor 23. This monitoring may occur over a predetermined time period, such as a twenty-four (24) hour time period. The ambient light levels in field of view 62 are stored in computer-readable memory 27 over time and mapped to a time of day. Upon completion, the map of ambient light levels in field of view 62 is transferred to secondary computer-readable memory 31 and stored therein, for reasons hereinafter described.

With smart camera 17 initialized, smart camera 17 enters a low power mode in which detectors, such as audio device 19 or sensor 20, monitors activity zone 60 within field of view 62 for activity and wherein the power drawn by image signal processor 23 from battery 59 is minimized to maximize the potential uptime of smart camera 17. With image signal processor 23 is in a low power mode, secondary processor 29 is maintained in the operation mode, as hereinafter described.

With secondary processor 29 in the operation mode, upon detection of a triggering event in activity zone 60 detected by the detector and/or upon receipt of a command from user device 40, a raw video stream of the field of view 62 is captured automatically by imaging device 18. The triggering event may be motion in activity zone 60, and the detector may be a motion detector. Instead of or in addition to detecting motion, the detector could include an IR sensor detecting heat, such as the body heat of an animal or person. The triggering event also could be sound, in which case the detector may include audio device 19. In such case, the triggering event may be a sound exceeding a designated decibel level or some other identifiable threshold.

Whether imaging device 18 operation is triggered by a command from by detection of a triggering event and/or upon receipt of a command from user device 40, imaging device 18 captures a raw video stream of field of view 62 which, in turn, can be provided to the image signal processor 23 for producing video packets for transmission, as hereinafter described. Similarly, audio device 19 can capture a raw audio stream which, in turn, can be provided to image signal processor 23 for producing audio packet for transmission, as hereinafter described.

In addition, with secondary processor 29 in the operation mode, upon detection of a triggering event in activity zone 60 detected by the detector and/or upon receipt of a command from user device 40, secondary processor 29 automatically accesses the map stored in secondary computer-readable memory 31 and adjusts the brightness and contrast settings of imaging device 18 in accordance with the ambient light levels in field of view 62 stored in secondary computer-readable memory 31 corresponding to time of day at which the triggering event in activity zone 60 occurred.

As secondary processor 29 adjusts the exposure of imaging device 18, image signal processor 23 is powered up to its operation mode in which image signal processor 23 once again establishes primary communication path 52 between primary wireless I/O communication device 64 and WLAN 12, as heretofore described. Secondary processor can thereafter control transmission of data to WAN 14, as heretofore described; capture of the raw video stream from imaging device 18; and capture of the raw audio stream from audio device 19. In addition, upon entering the operation mode, image signal processor 23 may generate an alert, such as a push notification ("PN"), which may be sent along primary communication path 52 to one or more user devices 40 indicating the triggering event. As noted above, if smart camera 17 detects a communication disruption/interruption in the primary communication path 52, image signal processor 23 activates secondary wireless I/O communication device 66 so as to allow data transmission/exchange with secondary wireless I/O communication device 76 of security hub 26 via secondary communication path 54.

In the operation mode, image signal processor 23 processes the captured raw video stream received from imaging device 18 and the raw audio stream received from audio device 19 to generate an enhanced media stream for transmission via one of the primary and secondary communication paths 52 and 54, respectively, to a respective hub 24 and/or 26 for further processing and/or further transmission to a server, such as the server 36 of the cloud-based control service system 34 and/or the user device(s) 40.

With the brightness and contrast settings of imaging device 18 adjusted to a level corresponding to time of day at which the triggering event in activity zone 60 occurred, the exposure of imaging device 18 is, in most cases, sufficiently adjusted such that the raw video stream supplied by imaging device 18 to image signal processor 23 is of sufficient clarity without further adjustment by image signal processor 23. However, if the brightness and contrast settings of imaging device 18 set by secondary processor 29 do not correspond to the ambient light levels in the environment surrounding smart camera 17 as detected by ambient light sensor 25, thereby resulting in the under or over exposure of the raw video image supplied to image signal processor 23, image signal processor 23 further adjusts the brightness and contrast settings of imaging device 18 to a proper level.

Utilizing the secondary processor 29 to adjust the brightness and contrast settings of imaging device 18 prior to waking image signal processor 23 minimizes the electrical power drawn from battery 59 associated with the convergence process. Further, by utilizing the secondary processor 29 to adjust the brightness and contrast settings of imaging device 18 prior to waking image signal processor 23, it is less likely that the first frames of video in the enhanced media stream will be transmitted with no detail or with over exposed or under exposed images.

Figure 5:
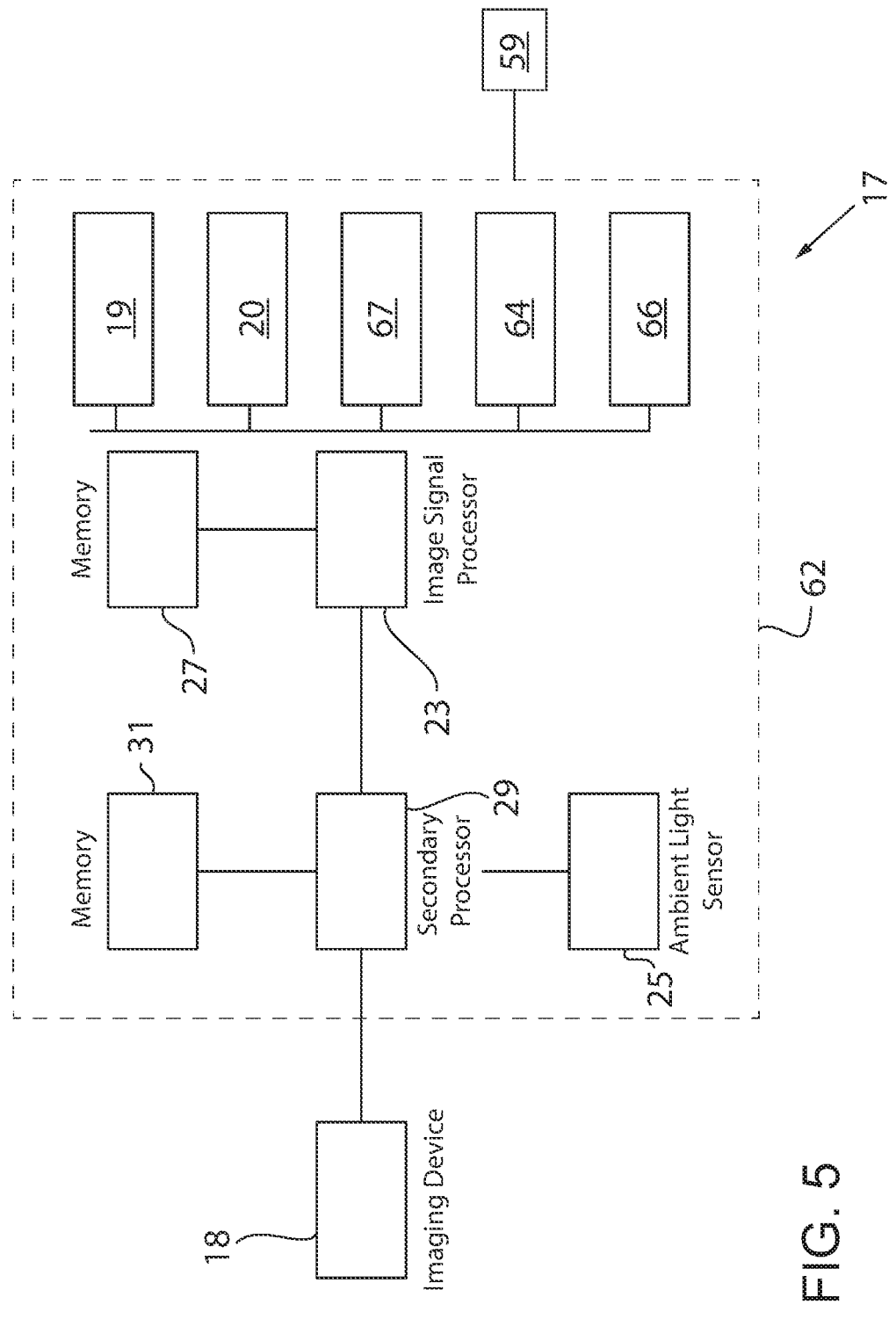
FIG. 5 is a schematic representation of the smart camera in accordance with a further aspect of the present invention.

Alternatively, referring to FIG. 5, it is contemplated to operatively connect ambient light sensor 25 to secondary processor 29 for detecting changes in light in the environment surrounding smart camera 17. As such, upon the powering up and initialization of smart camera 17, ambient light sensor 25 monitors the ambient light levels in field of view 62 under the direction of secondary processor 29 over a predetermined time period, preferably a twenty-four (24) time period. The ambient light levels in field of view 62 are stored in secondary computer-readable memory 31 over time and mapped to a time of day. Upon completion, the map of ambient light levels in field of view 62 is transferred to secondary computer-readable memory 31 and stored therein, for reasons hereinafter described.

Thereafter, upon detection of a triggering event in activity zone 60 detected by the detector and/or upon receipt of a command from user device 40, secondary processor 29 automatically accesses the map stored in secondary computer-readable memory 31 and adjusts the brightness and contrast settings of imaging device 18 in accordance with the ambient light levels in field of view 62 stored in secondary computer-readable memory 31 corresponding to time of day at which the triggering event in activity zone 60 occurred. If the brightness and contrast settings of imaging device 18 set by secondary processor 29 do not correspond to the ambient light levels in the environment surrounding smart camera 17, as detected by ambient light sensor 25, thereby resulting in the under or over exposure of the raw video image supplied to image signal processor 23, secondary processor 29 continues to adjust the brightness and contrast settings of imaging device 18 to a proper level.

By utilizing the secondary processor 29 to adjust the brightness and contrast settings of imaging device 18, the electrical power drawn by image signal processor 23 from battery 59 is reduced. Further, by utilizing the secondary processor 29 to adjust the brightness and contrast settings of imaging device 18 prior to waking image signal processor 23, it is less likely that the first frames of video in the enhanced media stream will be transmitted with no detail or with over exposed or under exposed images.

Once image signal processor 23 processes the captured raw video stream received from imaging device 18 and the raw audio stream received from audio device 19 to generate the enhanced media stream, the enhanced media stream may then be transmitted via WLAN 12 and WAN 12, as heretofore described, to a remote data storage device in communication with server 36 of the cloud-based control service system 34 for data storage and processing and/or user device(s) 40. Server 36 may also communicate with or include a computer vision program ("CV"), which can apply one or more filters or processes, such as edge detection, facial recognition, motion detection, etc., to detected one or more characteristics of the recording such as, but not limited to, identifying an individual, animal, vehicle, or package present in the recording. A filtered or otherwise processed image may be displayed on the user device 40, along with additional visual and/or audio messaging such as a text and/or audio message identifying a generic or particular person or object.

Various modes of carrying out the invention are contemplated as being within the scope of the following claims particularly pointing out and distinctively claiming a subject matter which applicant regards is the invention.

I claim:

1. A monitoring system comprising:
   a smart camera including
   an imaging device having a field of view and being configured to capture an image, the imaging device having a variable exposure, a detector operatively connected to the imaging device and being configured to generate a trigger signal in response to activity within the field of view, a first processor operatively connected to the detector and the imaging device, the first processor having a low power mode and an operation mode, a second processor operatively connected to the detector and the imaging device, and a computer-readable memory operatively connected to the first processor and the second processor, the computer-readable memory being configured to store a map of ambient light levels in the field of view at the selected times of day, wherein the second processor is configured to:

access the map stored on the computer-readable memory in response to receipt of the trigger signal;

adjust the exposure of the imaging device in accordance with the map; and monitor the ambient light levels in the field of view; and adjust the exposure in response to the monitored ambient light levels in the field of view;

a base station in communication with the smart camera and at least one user-operated monitoring device having a screen capable of displaying video images; and a controller contained at least in part within at least one of the smart camera and the base station, the controller being configured to execute a program stored in a non-transitory medium to send a video clip of the monitored area to the user-accessible monitoring device.

2. The monitoring system claim 1, further comprising an ambient light sensor operatively connected to at least one of the first processor and the second processor, the ambient light sensor sensing ambient light levels in the field of view.

3. The monitoring system of claim 1, wherein, upon initialization of the smart camera, the first processor is configured to generate the map of ambient light levels in the field of view at the selected times of day in response to the ambient light levels.

4. The monitoring system of claim 1, wherein the first processor is configured to be in the low power mode when the second processor varies the configuration of the imaging device in response to the map.

5. The monitoring system of claim 1, wherein the imaging device includes an adjustable aperture and shutter speed, and wherein adjustment of the adjustable aperture and shutter speed varies the exposure of the imaging device.

6. The monitoring system of claim 1, wherein the second processor is configured to vary the exposure of imaging device in response to receiving the trigger signal in accordance with the stored ambient light level for a selected time of day corresponding to the time of day that the trigger signal is received.

* * * * *